United States Patent [19]

Nonweiler et al.

[11] Patent Number: 5,418,572
[45] Date of Patent: May 23, 1995

[54] METHOD OF AND APPARATUS FOR DISPLAYING IMAGES AT DIFFERENT RATES

[75] Inventors: Brian R. G. Nonweiler, Speen; Simon D. Rogers, Newbury, both of England

[73] Assignee: Quantel Limited, Newbury, United Kingdom

[21] Appl. No.: 55,037

[22] Filed: Apr. 29, 1993

Related U.S. Application Data

[63] Continuation-in-part of Ser. No. 962,306, Oct. 16, 1992.

[30] Foreign Application Priority Data

Apr. 29, 1992 [GB] United Kingdom ............... 9209204

[51] Int. Cl.$^6$ ............................................. H04N 7/01
[52] U.S. Cl. ...................... 348/446; 348/458; 348/911
[58] Field of Search ............... 358/140, 214, 185, 348; 348/446, 458, 911, 722, 97; H04N 7/01

[56] References Cited

U.S. PATENT DOCUMENTS

| | | | |
|---|---|---|---|
| 3,764,737 | 10/1973 | Fischman | 358/1 |
| 4,881,125 | 11/1989 | Krause | 358/140 |
| 4,998,167 | 3/1991 | Jaqua | 358/140 |
| 5,191,427 | 3/1993 | Richards | 358/214 |
| 5,221,966 | 6/1993 | Clayton | 358/140 |
| 5,255,091 | 10/1993 | Lyon | 358/140 |
| 5,260,787 | 11/1993 | Capitant | 358/140 |

FOREIGN PATENT DOCUMENTS

| | | | |
|---|---|---|---|
| 0010433 | 4/1980 | European Pat. Off. | H04N 3/36 |
| 0467683 | 1/1992 | European Pat. Off. | H04N 7/01 |

OTHER PUBLICATIONS

Poetsch, D., "FDL 60—An Advanced Film Scanning System", SMPTE Journal, vol. 93, No. 3, Mar. 1984, pp. 216–227.

Schutz, G., "Problems in the PAL Tape to Film System", The BKSTS Journal, vol. 67, No. 12, Dec. 1985, pp. 670–673.

*Primary Examiner*—James J. Groody
*Assistant Examiner*—Sherrie Hsia
*Attorney, Agent, or Firm*—Cooper & Dunham

[57] ABSTRACT

A method of and apparatus for displaying an image clip comprising a plurality of image frames on an electronic monitor includes separating each image frame from the next image frame by an overscan period. In this way image frames captured at a first frame rate can be displayed at the first frame rate on a monitor arranged normally to display images at a second frame rate, different to the first frame rate. In practice, the overscan period is created by adjusting driving circuitry for the monitor to increase the number of lines of data output to the monitor during a frame or field period whilst maintaining the line rate constant.

22 Claims, 3 Drawing Sheets

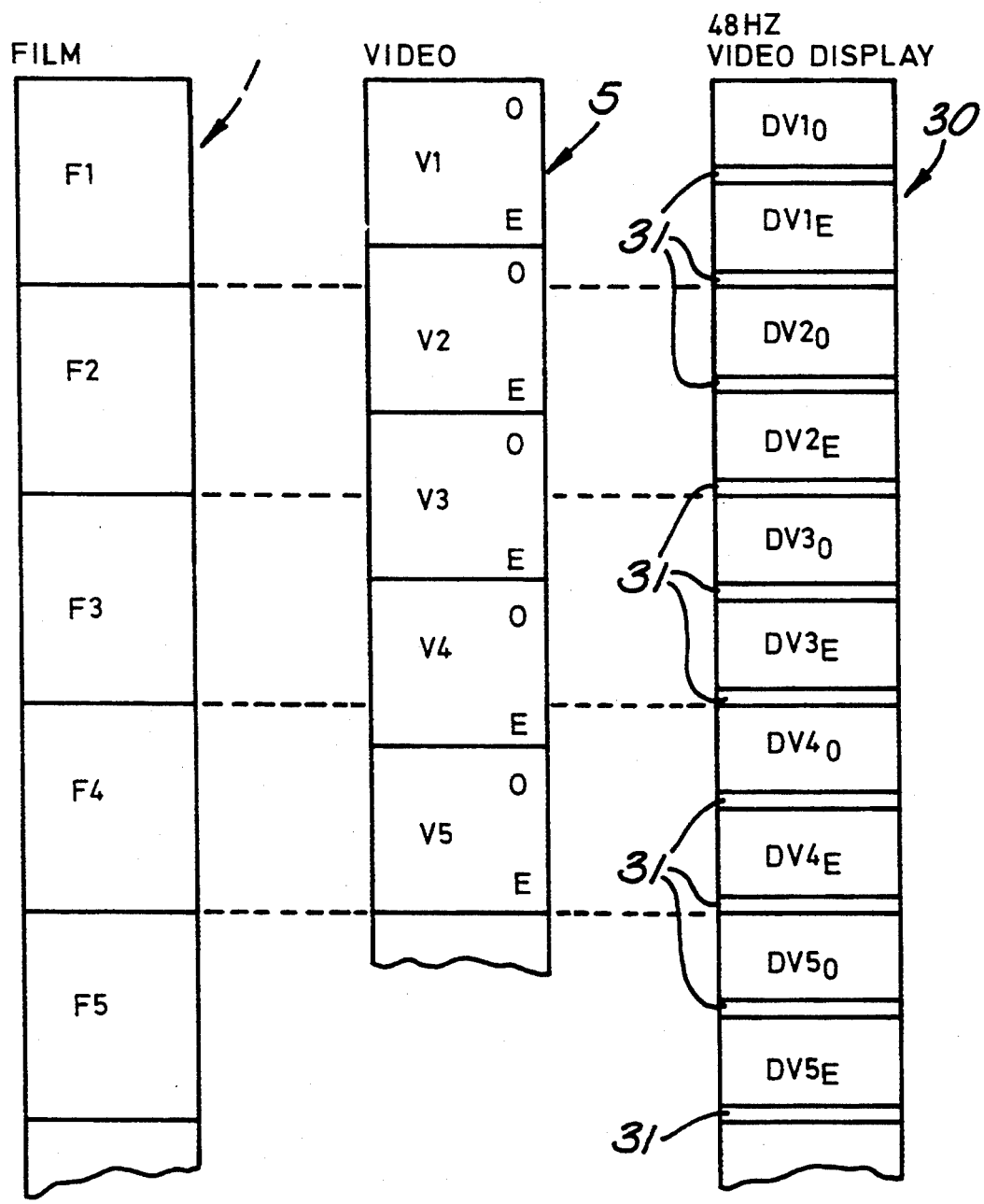

METHOD OF AND APPARATUS FOR DISPLAYING IMAGES AT DIFFERENT RATES

This application is a continuation-in-part of U.S. application No. 07/962,306 filed Oct. 16, 1992.

FIELD OF THE INVENTION

The invention relates to a method of and apparatus for displaying images. The invention has particular, but not exclusive, application to the display of images captured at one frame rate on a monitor at another frame rate, for example the display at video frame rate of images captured at film frame rate.

DESCRIPTION OF THE RELATED ART

During post production work it is common for images captured on film to be converted into electrical video signals for storage and modification in an electronic environment. Once converted into electrical signals the images can be edited, combined with other images and/or modified for example by retouching features in the image or adjusting the colour balance of the image.

One of the problems associated with converting between film and video is that the display rate differs between the two media. Film is usually captured at a rate of 24 frames per second whereas video according to the HDTV standard is displayed at a rate 30 frames per second. When converting from film to video it is usual to maintain the integrity of the frames by converting each film frame to a corresponding single video frame. This enables each frame in the film to be accessed for editing and/or modification which is essential for example where mattes are to be produced electronically for use in combining two images on a frame by frame basis. Also, editing can be work out in an electronic environment, thereby avoiding the need actually to cut film and enabling many different edit combinations to be tried. Once the editor is satisfied with the result of an edit list can be produced which identifies the manner in which frames are combined, thus enabling cutting of the film to match exactly the video edit.

Editing work is usually done on a frame-by-frame basis and electronic editing equipment is available which is able to display simultaneously several frames of one or more video clips at respective display areas of the monitor. Thus, during editing there are usually no significant problems caused by the different display rates of the two media because frames are viewed as stills on the monitor.

However, during playback of the video one effect of the one-to-one conversion from film is that movement in the video image is seen speeded up as compared to corresponding movement in the film image. The reason for this will be explained with reference to FIG. 1 of the accompanying drawings. As shown in FIG. 1 a film clip 1 comprises a plurality of film frames F1 to F5. As mentioned hereinabove a film clip comprises a plurality of image frames captured at a rate of twenty four frames per second. The human eye is sensitive to the fundamental frequency at which moving images are displayed and when film is displayed at twenty four frames per second a 24 Hz flicker can be seen in the displayed image. In order to reduce the perceived flicker film projectors are provided with a double-shuttered arrangement whereby each frame is displayed twice. This double-shuttered projection arrangement increases the fundamental frequency of display to 48 Hz which is less detectable by the human eye. This double shuttered displaying of film is represented in FIG. 1 by the clip 2 in which each frame is displayed twice, eg $F1_A$ and $F1_B$, with the displays $F1_A$ and $F1_B$ being separated by an in-frame blanking period 3 and the display of consecutive frames, eg $F1_B$ and $F2_A$ separated by an inter-frame blanking period 4 corresponding to the frame pull down period of the projector or other display apparatus (not shown).

Next to the displayed clip 2 in FIG. 1 there is shown a video clip 5 comprising plural video frames V1 to V5. The video frames V1 to V5 correspond respectively to the film frames F1 to F5. The vertical length of each frame in FIG. 1 represents the length of time that the frame is displayed during playback. As can be seen five frames of the video clips correspond to the same period of time as four frames of the film clip 1. Thus, if the video frames V1 to V5 are output for display at video rate (30 frames per second) the playback will be 25% quicker than the display of corresponding film frames F1 to F5 at film rate (24 frames per second) and movement in the image when displayed will be speeded up accordingly.

Video frames are formed from interleaved fields which are displayed at twice the frame rate. Thus, each video frame is formed from two interleaved fields, one field corresponding to all of the even numbered lines in the frame and the other field corresponding to all of the odd numbered lines in the field. The odd and even fields in each frame of video V1 to V5 are represented by the symbols '0' and 'E' in FIG. 1.

One way in which the above problem of different display rates can be overcome is to increase the number of fields used to represent video frames. By increasing the number of fields representing two consecutive video frames from four to five, the time period occupied by the two video frames will equal that of the corresponding two film frames. This approach is known as 3:2 pull down and is illustrated by the display scan clip 6 shown in FIG. 1 of the accompanying drawings. As can be seen in FIG. 1 the first two film frames F1 and F2 are displayed as a first display frame 7 comprising an odd field $V1_O$ and an even field $V1_E$ and a second display frame 8 comprising two odd fields $V2_O$ and an even field $V2_E$. The second frame 8 is displayed by outputting first the odd field $V2_O$ then the even field $V2_E$ and then the same odd field $V2_O$ once again.

One problem associated with 3:2 pull down is caused by the repeated display of one field in every other frame in the clip. The extra field in every other frame causes that frame to be displayed for a longer period of time and thus motion in the frame during preview is slowed down by the presence of the extra field. This slowing down of motion only occurs in every other field and over two consecutive fields the average speed of motion is correct. However, the difference between the two fields causes a moving object to appear to move jerkily across the image. The introduction of such unwanted movement artifacts in the image is clearly undesirable.

Furthermore as mentioned hereinabove, odd and even fields making up a frame are interleaved and during the previewing of a clip the monitor alternates between the display of odd and even fields. This creates a problem when a clip is displayed using 3:2 pull down, the problem being apparent from inspection of the fields making up the first and second frames 7 and 8 in the displayed clip 6. It will be seen that the correct sequence of display of odd and even fields is maintained by reversing the order of display of the two fields comprising the third frame 9. Moreover, the order of the three fields comprising the fourth frame 9a is even-odd-even, the reverse of the sequence of the second frame 8. It will be appreciated that 3:2 pull down therefore requires complex control circuitry to control the order in which fields are delivered to the monitor for display.

An alternative to the use of 3:2 pull down is to increase the number of video frames in a clip to be displayed using techniques usually associated with slow-motion effects, such as those described in U.S. Pat. No. 5,105,313 and corresponding published European application no. 311268, the teachings of which are incorporated herein by reference. One problem with this approach is that the one-to-one relationship between the film frames F1 to F10 and the displayed frames is lost.

SUMMARY OF THE INVENTION

The present invention aims to overcome the above and associated problems by providing a scheme by which video frames corresponding to respective film frames are displayed at a rate corresponding to the display rate of the film frames.

According to one aspect of the invention therefore there is provided a method of displaying an image clip comprising a plurality of image frames on an electronic monitor, in which method each frame is provided to the monitor for display separated from the next image frame by an overscan period.

According to another aspect of the invention there is provided an apparatus for displaying an image clip comprising a plurality of image frames, the apparatus comprising a monitor and control means for providing each image frame to the monitor for display separated from the next image frame by an overscan period.

In a further aspect the invention provides a system for displaying an image clip comprising image frames captured at a first frame rate on a display arranged normally to display images at a second frame rate different to the first frame rate, the system comprising source means for supplying data defining a plurality of lines of pixels representing said image frames to said display, and control means for increasing the number of line synchronising signals supplied to the display between consecutive vertical synchronising signals in order that said image frames are displayed on said display at said first frame rate.

The invention also provides an image display system for displaying an image sequence on a monitor at a reduced frame rate, the system comprising circuitry for increasing the number of displayed lines forming each displayed frame.

The invention extends to an image display system in which the frame display rate of a monitor is reduced by increasing the amount of image information for each image frame supplied to the monitor whilst maintaining constant the rate at which said information is supplied.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

In the drawings:

FIG. 3 is a schematic representation of the method of display in the system of FIG. 2.

DESCRIPTION OF THE PREFERRED EMBODIMENTS

Figure 1:
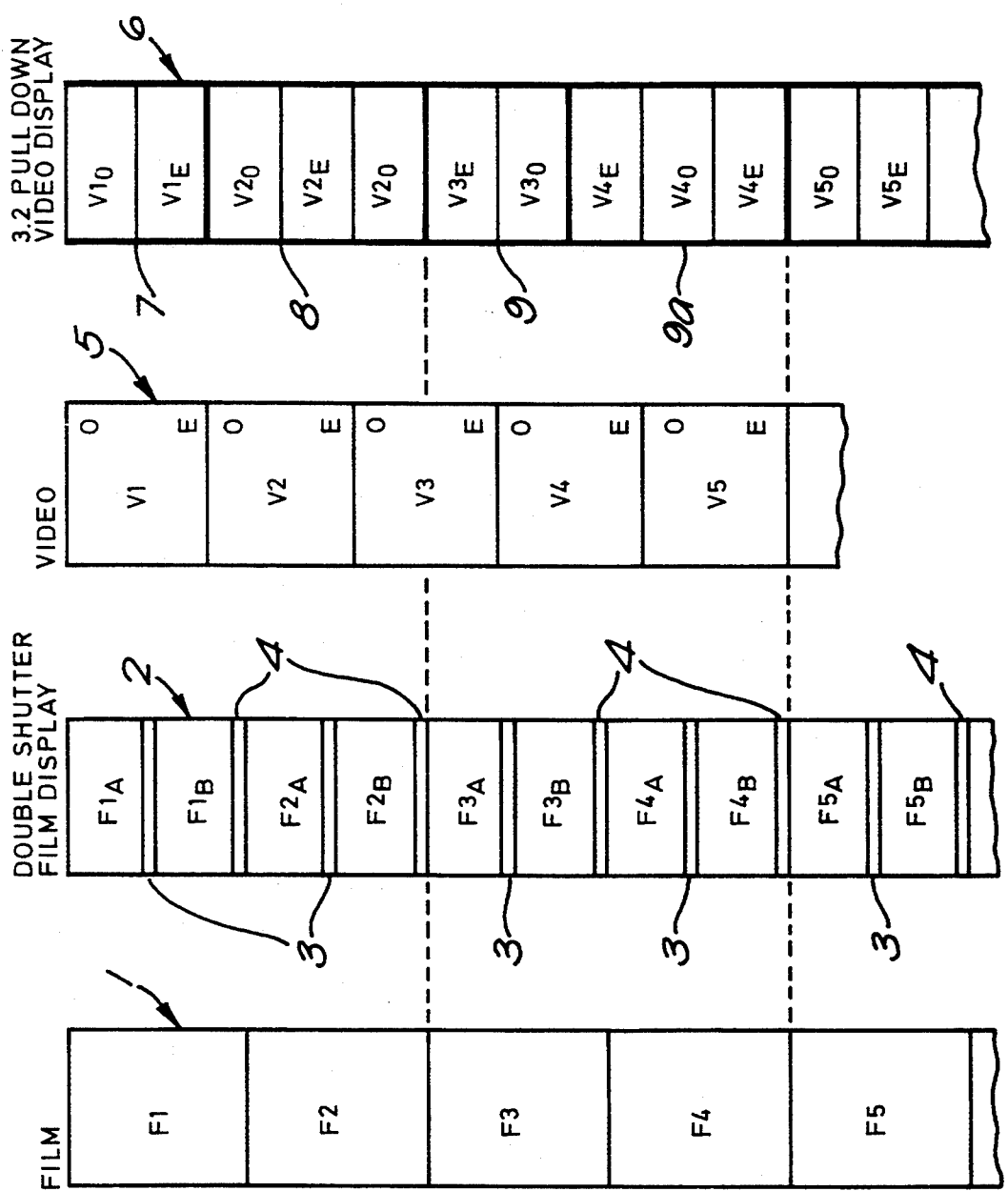
FIG. 1 is a schematic representation of known methods of display.
Figure 2:
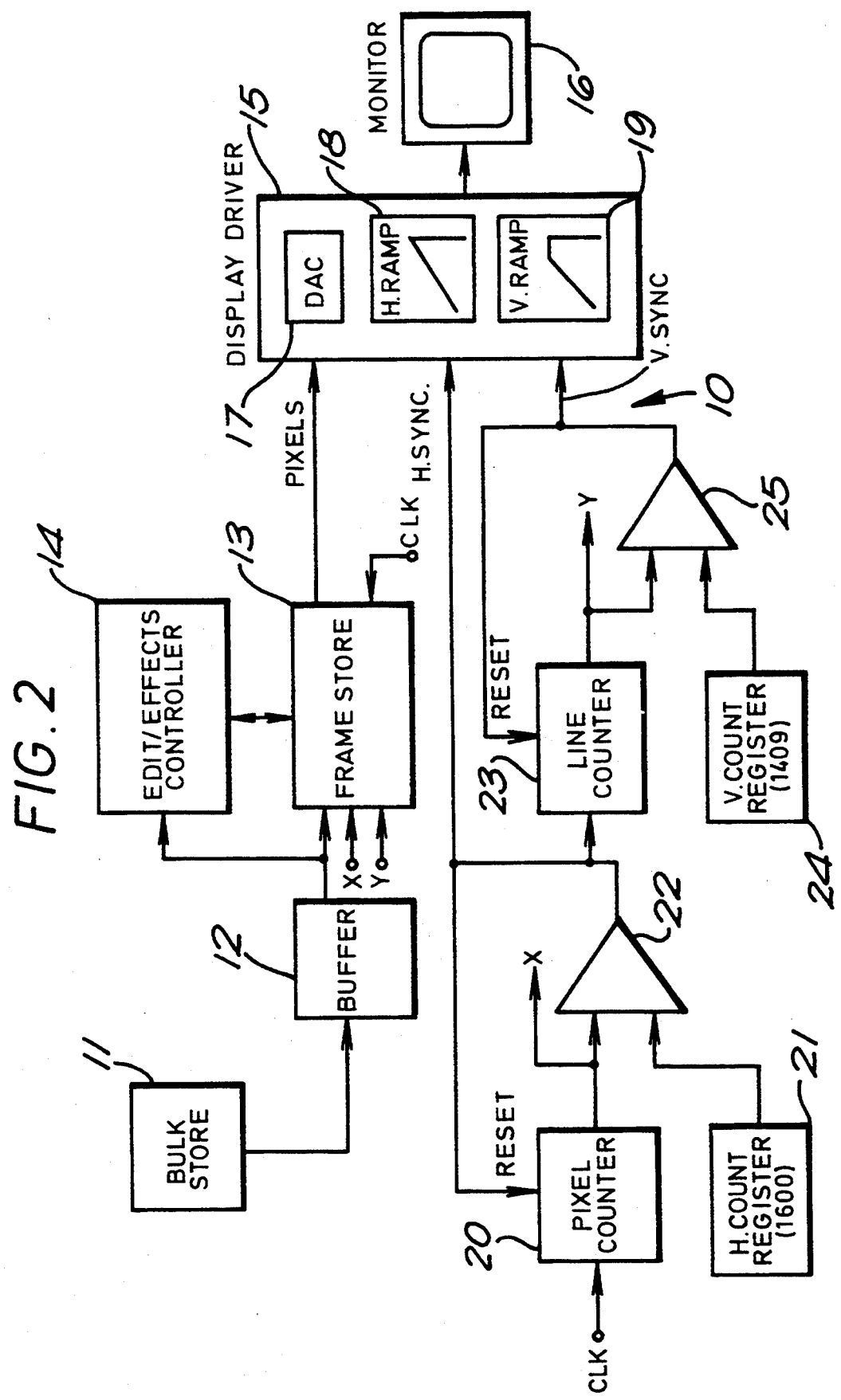
FIG. 2 is a schematic system diagram of a system for displaying an image clip.

Referring now to FIG. 2 of the accompanying drawings, there is shown an editing system 10 comprising a bulk store 11 for storing data representing the frames of plural video clips. The bulk store may for example be an array of disc drives among which the video frames are distributed, such as the store disclosed in commonly owned U.S. application Set. No. 07/962,306 filed Oct. 16, 1992, which is incorporated herein by reference. The data representing the video frames is preferably high resolution data, for example 1125 lines per frame, and the bulk store 11 is able to deliver video frames at display rate (30 frames per second) according to the HDTV standard. Data may be recorded off-line on a VTR for example and downloaded into the bulk store when required. For the purpose of further explanation it will be assumed that the bulk store 11 contains data representing frames of a video clip derived from respective frames of a film clip. That is to say the bulk store 11 at least contains data representing the video clip 5 comprising video frames V1 and V5 as illustrated in FIG. 1 of the drawings.

Data from the bulk store 11 is delivered via a buffer 12 to a framestore 13 and/or to an edit/effects unit 14 which enables for example individual or groups frames to be retouched or otherwise modified and enables two or more video clips to be combined. That is to say, the unit 14 is able to perform editing operations similar to those available in the system manufactured and sold by us under the trade mark "HARRY".

Pixel data from the framestore 13 are input at display rate to a display driver 15. The rate of transfer of pixels from the framestore 13 to the display driver 15 is controlled by a system clock CLK running at display rate, which in the case of HDTV is 54MHz. Addressing circuits (not shown) within the framestore 13 ensure that pixels are read from the framestore 13 in raster order. The display driver 15 converts the pixel data into an analogue signal which is used to drive a monitor 16 to display thereon the image represented by the data.

As is well known, in a TV type monitor an image is displayed on a screen by scanning an electron beam over the screen in raster sequence. In the case of a colour monitor three beams are used to cause red, green and blue components forming a colour image to be displayed on the screen. The or each beam is controlled by a video signal which varies continuously the intensity of the beam, a horizontal scan signal which causes the beam to scan horizontally across the screen and to return quickly at the end of one scan line to the beginning of the next, and a vertical scan signal which causes the beam to move to the next scan line and when the bottom of the screen is reached to return quickly to the top of the screen.

The display driver 15 comprises a digital to analogue converter circuit 17 for converting pixels into a video signal for varying the intensity of the or each electron beam, a horizontal ramping circuit 18 for generating the required horizontal scan signal, and a vertical ramping circuit 19 for generating the required vertical ramp signal. The horizontal ramping circuit 18 produces a signal which ramps up from a minimum to a maximum in a period corresponding to that of a single line scan and is reset to the minimum by an external synchronising signal H. Sync. Similarly, the vertical ramping circuit 19 produces a signal which ramps up from a minimum to a maximum in a period corresponding to that of a field scan (ie all 563 odd and 562 even numbered lines in a 1125 line system) and is reset to the minimum by an external synchronising signal V. Sync.

The system 10 includes circuitry for generating the H. Sync. and V. Sync. signals used to control scanning in the monitor 16. A pixel counter 20, driven by the clocking signal CLK running at the rate of display of pixels on the monitor 16, ie 13.5 MHz, counts clock pulses each corresponding to the outputting of a pixel from the framestore 13. A register 21 contains a value corresponding to the number of pixels in each line. For a high definition TV picture of the above mentioned standard each line comprises 1600 pixels and so a value corresponding to that number is held in the register 21. The pixel counter 20 and the register 21 are connected to a comparator 22 arranged such that when the contents of the counter and the register are the same, ie the counter has counted to 1600, a pulse is output to a line counter 23 and to a reset input in the pixel counter 20 causing the pixel counter to reset to zero.

It will be appreciated that at any given instant in time the output from the pixel counter 20 will be directly related to the address of the pixel in the framestore 13. The count X from the pixel counter 20 is therefore delivered to the framestore 13 in order to identify the address of the data defining the current pixel to be displayed.

The output from the comparator 22 corresponds to the abovementioned H.Sync. signal and is input to the display driver 15 causing the horizontal ramping circuit 18 to reset to minimum. Each time an H. Sync. pulse is applied to the input of the line counter 23 it causes the counter 23 to increment by one odd or even line number depending on whether it is data for an odd or even field that is currently being output to the monitor for display. Each displayed video frame is, of course, made up from interlaced odd and even fields but for the purpose of simplifying the following explanation description will be made of the circuits operation in respect of the odd field only. The output from the line counter 23 is also directly related to the address of the pixel in the framestore 13. The count Y from the line counter is therefore delivered to the framestore 13 in order to identify the vertical address of the data defining the current pixel to be displayed.

A second register 24 contains a value corresponding to the highest numbered line in the field. In a 1125 line system the register 24 would contain a value corresponding to the number 1125. The line counter 23 and the second register 24 are coupled to a comparator 25 which outputs a pulse when the count in the line counter 23 matches the value in the register 24. The signal from the comparator 25 corresponds to the abovementioned V.Sync. signal and is used to reset the line counter 23 ready to count lines in the next field and to cause the vertical ramping circuit 19 to reset to a minimum.

When a video clip derived from a film clip is to be displayed the value in the register 24 is increased by 25%, ie to the value 1409 so that the number of lines counted between V.Sync. pulses is increased. The pixel clock rate remains the same (54MHz) and the rate at which lines are scanned also remains unchanged but since the number of lines has increased, the duration of each frame is increased accordingly. Since the vertical ramping circuit 19 is arranged to ramp up to a maximum in a time period corresponding to the full 1125 lines it will remain at the maximum for any further lines thereafter, only resetting when a V. Sync. pulse is received. Thus, the electron beam of the monitor 16 is caused to scan each line in the field being displayed and then to scan repeatedly the last line until the V.Sync. pulse causes the ramping circuit to reset.

The system is also arranged so that once all lines of data defining the field have been output from the framestore 13 only null data is output until such time as the line counter is reset to zero.

The effect that this increase in the number of lines between V.Sync. pulses has on the timing of the displaying of the clip is shown in FIG. 3 of the accompanying drawings. Referring to FIG. 3 it will be seen that the film clip 1 and corresponding video clip 5 are identical to the film and video clips shown in FIG. 1. Thus, video frames V1 to V5 represent respective ones of the film frames F1 to F5. For a given video field, eg $V1_o$ which is the odd field of frame V1, all pixels are clocked from the framestore 13 at video display rate for display on the monitor. Once data for all pixels in a given field has been output for display null data is output for display until such time as the V.Sync. pulse is generated, thereby identifying the start of a new field. Thus the pixels represented by the null data are displayed on the last line of the monitor. The contribution that the last line makes to the image is negligible and indeed in most cases the last line is not seen on the display at all. The null data supplied to the monitor may therefore have any suitable value for example corresponding to say black pixels where the last line is visible or black or white pixels or even to a part of the image displayed elsewhere on the monitor where the last line cannot be seen on the monitor.

By increasing the number of lines between V. Sync. pulses whilst leaving unchanged the rate of which image pixels are output for display, the system 10 generates a display output comprising odd and even video fields $V1_O$, $V1_E$, $V2_O$, $V2_E$, etc each separated by an overscan period 31. The overscan periods 31 correspond approximately to the projection blanking periods 3 and 4 during the display of a film clip as shown in FIG. 1. Thus, video fields are displayed at a rate of forty eight fields per second and thus corresponds to the 48 Hz rate achieved by double-shuttered projection. That is to say, the rate at which the fields $DV1_O$, $DV1_E$, etc. are displayed is reduced to the double-shuttered frame rate of the film 1.

During the overscan periods 31 there is no refresh of the displayed image and this affects flickering of the displayed image. However, the flickering is at 48Hz and is in many respects similar to the flicker present in double-shuttered film displays. After a few minutes viewing the viewers eye compensates for any flicker so that the perceived level of flicker is reduced significantly.

By introducing overscan periods 31 between the display of consecutive fields the abovementioned problem of jerky movement in the displayed image is overcome and movement is seen to occur at the correct speed.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. A method of displaying an input image clip on an electronic monitor for displaying image frames during respective display frame periods at displaying frame rate the input image clip comprising a plurality of input image frames at an input frame rate, said display frame rate being greater than the input frame rate, which method comprises the steps of:
   providing each frame of said plurality of input image frames to the monitor at the input frame rate; and
   displaying each input image frame on the monitor by extending each of the respective display frame periods to include at least one overscan period which so increases said respective display frame periods that the input image clip is displayed on the monitor at the input frame rate.

2. A method as claimed in claim 1, wherein each input image frame is divided into an odd input field and an even input field and each display frame period is divided into an odd display field period and an even display field period, each odd input field being provided to the monitor for display during a corresponding odd display field period and each even input field being provided to the monitor for display during a corresponding even display field period, and each display field period is separated from the next display field period by said overscan period.

3. A method as claimed in claim 1, wherein said step of extending comprises creating the at least one overscan period by adding additional lines to increase the number of lines representing each frame to be greater than the number of lines available on the monitor for display of each frame.

4. A method as claimed in claim 3, wherein the additional lines comprise null data and are provided for display during the at least one overscan period.

5. A method as claimed in claim 3, wherein the additional lines are provided for display at or off the bottom of a screen of the monitor.

6. An apparatus for displaying an input image clip, the input image clip comprising a plurality of input image frames at an input frame rate, the apparatus comprising:
   a monitor for displaying image frames during respective display frame periods at a display frame rate greater than the input frame rate; and
   a controller for providing each input image frame to the monitor at the input frame rate and for causing each display frame period to include at least one overscan period which so increases the respective display frame periods that the input image clip is displayed on the monitor at the input frame rate.

7. An apparatus as claimed in claim 6, further comprising a frame dividing circuit for dividing each input image frame into an odd input field and an even input field and wherein said controller is arranged to divide each display frame period into an odd display field period and an even display field period, to provide each odd input field to the monitor for display during a corresponding odd display field period and each even input field to the monitor for display during a corresponding even display field period, and to separate each display field period from the next display field period by said overscan period.

8. An apparatus as claimed in claim 6, further comprising a line adding circuit for adding lines to increase the number of lines representing each frame to be greater than the number of lines available on the monitor for display of each frame.

9. An apparatus as claimed in claim 8, wherein the line adding circuit is arranged to add lines comprising null data which are provided for display during said at least one overscan period.

10. An apparatus as claimed in claim 8, wherein the line adding circuit is arranged to add lines for display at or off the bottom of a screen of the monitor.

11. A system for displaying an image clip having image frames captured at a first frame rate, the system comprising:
    a linescan display, having a plurality of display scanlines, which is responsive to line synchronizing signals indicating that the end of a linescan has been reached and vertical synchronizing signals indicating that the end of a display scan has been reached, and being arranged normally to display images at a second frame rate greater than the first frame rate,
    a source for supplying data defining a plurality of lines of pixels representing said image frames to said display, and
    a control circuit for controlling the generation of said line synchronizing signals and said vertical synchronizing signals such that the number of line synchronizing signals between consecutive vertical synchronizing signals is such that the vertical synchronizing signals are generated at a reduced rate corresponding to the first frame rate in order that said image frames are displayed on said display at said first frame rate.

12. A system as claimed in claim 11, wherein said control circuit comprises a pixel counter for counting pixels between the line synchronizing signals and a line counter for counting lines between the vertical synchronizing signals.

13. A system as claimed in claim 12, wherein said pixel counter and said line counter each output a respective count which is supplied to said source to synchronize the supplying of data therefrom to said line synchronizing signals and said vertical synchronizing signals.

14. A system as claimed in claim 13, wherein said control circuit further comprises a comparing circuit for comparing the count output from said pixel counter with a predetermined value and for generating said line synchronizing signals according to the result of the comparison.

15. A system as claimed in claim 13, wherein said control circuit comprises a comparing circuit for comparing the count output from said line counter with a predetermined value and for generating said vertical synchronizing signals according to the result of the comparison.

16. A system as claimed in claim 11, wherein said source comprises a store having a serial output for outputting data in display order.

17. A system as claimed in claim 11, wherein said display comprises a display driver, responsive to said data from said source and to said line synchronizing signals and said vertical synchronizing signals, for producing driving signals to drive a monitor for the display of the image clip thereon.

18. A system as claimed in claim 17, wherein said display driver comprises a horizontal ramping circuit for producing an output signal which resets to a minimum in response to a line synchronizing signal and ramps up to a maximum over the period between successive line synchronizing signals.

19. A system as claimed in claim 17, wherein said display driver comprises a vertical ramping circuit for producing an output signal which resets to a minimum in response to a vertical synchronizing signal, ramps up to a maximum over a period corresponding to a normal field display period at said second frame rate, and remains at said maximum until a reset occurs.

20. A system as claimed in claim 11, further comprising an image processing circuit for processing said image frames before said frames are displayed.

21. A method as claimed in claim 1, wherein each display frame period is separated from the next display frame period by said at least one overscan period.

22. An apparatus as claimed in claim 6, wherein the controller causes each display frame period to be separated from the next display frame period by said at least one overscan period.

* * * * *